United States Patent [19]

Heinzl et al.

[11] Patent Number: 5,407,280
[45] Date of Patent: Apr. 18, 1995

[54] MINIATURE AIR BEARINGS

[75] Inventors: Joachim Heinzl, Dreisesselbergstrasse 16, D-8000 München, 90; Wolfram Runge, München, both of Germany

[73] Assignee: Joachim Heinzl, Munich, Germany

[21] Appl. No.: 84,940

[22] Filed: Jun. 30, 1993

[30] Foreign Application Priority Data

Jul. 6, 1992 [DE] Germany ............... 42 22 140.4

[51] Int. Cl.$^6$ ............................................ F16C 32/06
[52] U.S. Cl. ................................. 384/12; 384/100; 384/907
[58] Field of Search ............... 384/12, 907, 100, 399, 384/373

[56] References Cited

U.S. PATENT DOCUMENTS

| | | | |
|---|---|---|---|
| 4,738,010 | 4/1988 | Ehrfeld et al. | 384/907 |
| 4,887,914 | 12/1989 | Lin et al. | 384/399 |
| 4,946,293 | 8/1990 | Helms | 384/12 |
| 5,098,203 | 3/1992 | Henderson | 384/12 |

*Primary Examiner*—Lenard A. Footland
*Attorney, Agent, or Firm*—Anderson Kill Olick & Oshinsky

[57] ABSTRACT

A miniature air bearing for supporting and guiding parts has a bearing surface of monocrystalline silicon. Nozzles are formed on the bearing surface by means of anisotropic etching for feeding air.

11 Claims, 4 Drawing Sheets

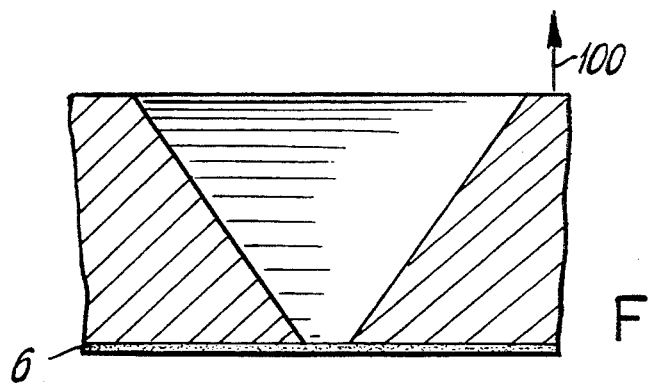
FIG. 3a
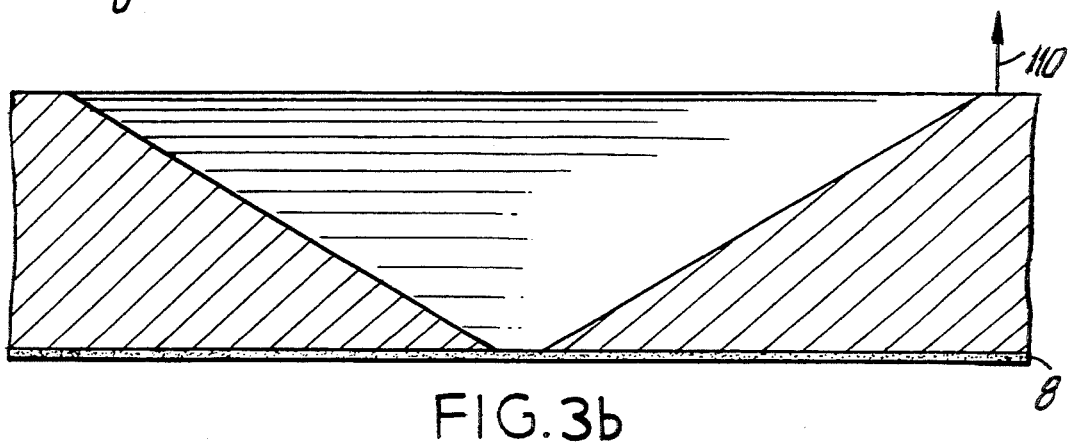
FIG. 3b
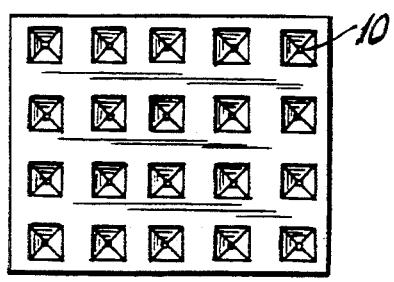
FIG. 4a
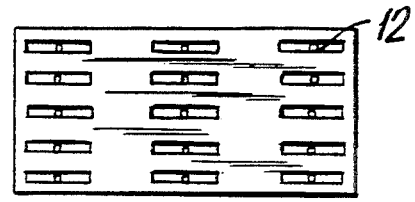
FIG. 4d
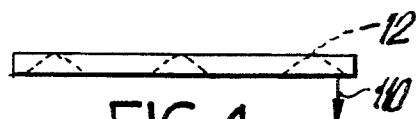
FIG. 4b
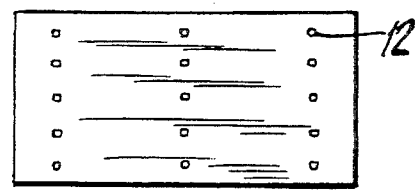
FIG. 4e
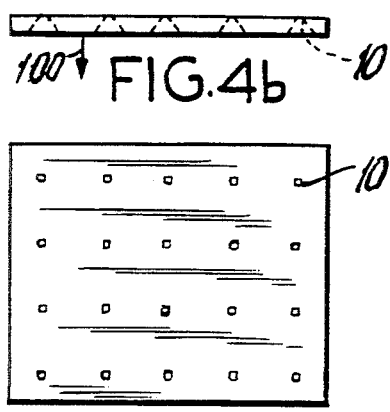
FIG. 4c
FIG. 4f

MINIATURE AIR BEARINGS

FIELD OF THE INVENTION

The present invention is directed generally to air bearings and more particularly to miniature air bearings for supporting and guiding moving parts wherein one of bearing surfaces, formed by monocrystalline silicon, has nozzles formed by anisotropic etching, for feeding air.

BACKGROUND OF THE INVENTION

Air bearings have been produced by forming bores into metallic bearing surface and inserting clockwork precious stones into these bores in order to perform the throttling function. The throttling function is also often achieved by nozzles drilled directly into the metal.

Another fabrication process involves manufacturing the element supported in the bearings or the fixed portion of the bearing from sintered metal and producing the micronozzles and the geometric shape of the bearing surface by a rolling process and subsequent surface area milling with a diamond-tipped tool bit.

However, it is desirable, and an object of the invention is to produce bearing surfaces whose waviness and roughness lie in the range of nanometers.

Another object of the invention is to provide a miniature air bearing which avoids turbulent flow and who feeding air has precisely defined throttling properties.

SUMMARY OF THE INVENTION

These and other objects of the invention which shall become apparent hereafter, are achieved by the present miniature air bearings where at least one of the two bearing surfaces is formed by monocrystalline silicon into and has nozzles formed therein by anisotropic etching, making it possible to produce bearing surfaces whose waviness and roughness lie in the range of nanometers. The stiffness or rigidity of the thin silicon chip can be increased by fixedly connecting the same with a rigid support member by, for instance, applying it upon a glass member. It is possible to avoid a turbulent flow by distributing a plurality of precisely defined nozzles across the surface of the chip.

Miniature air bearings for supporting and guiding moving parts are the subject of the invention. It has been a problem to produce air bearings with a precisely defined geometry of the bearing surfaces and nozzles for feeding air with precisely defined throttling properties. The air bearings are to enable to guide moving machine parts and micromechanical elements with the highest precision, as well as to achieve a high rigidity of the support. This assumes that one is successful in achieving a laminar flow along the nozzles and in the bearing gap and to avoid turbulence. Turbulence in the flow can also have a detrimental effect on the quality and precision of the air bearings.

Through the geometry of the nozzles with the narrowest cross-section directly at the outlet of the air into the bearing gap or clearance, the dead volume, also called chamber volume, is optimally reduced, so that dynamically stiff bearings, which are stable against self-induced vibrations, are formed.

The high quality of the bearing surface, with a corresponding matching surface, enables to achieve clearance heights down to 100 nm. Such small air gap heights were hitherto achieved only in aerodynamic bearings as, for instance, in flying combined write-read heads of magnetic disk storage drives. While relative velocities of 10 m/s and more are necessary there, in order to build up the required laminar air cushion, the proposed bearings can maintain this air gap height in a stable manner also without relative velocities.

BRIEF DESCRIPTION OF THE DRAWINGS

The invention will be better understood from the Detailed Description of the Preferred Embodiment, with reference to the drawings, in which:

FIG. 1b depicts a top view of the micronozzle shown in FIG. 1a;

FIG. 1c depicts a cross-sectional view along line 1c—1c in FIG. 1a;

FIG. 2b depicts a top view of the micronozzle shown in FIG. 2a;

FIG. 2c depicts a cross-sectional view along line 2c—2c in FIG. 1a;

FIG. 3a depicts a cross-sectional view of a micronozzle in 100-silicon with an etched stop layer fabricated with etched stop layers;

FIG. 3b depicts a cross-sectional view of a micronozzle in 110-silicon with an etched stop layer;

FIG. 4a depicts a top view of an air bearing element with a plurality of micronozzles in 100-silicon;

FIG. 4b depicts a side view of the air bearing element shown in FIG. 4a;

FIG. 4c depicts a bottom view of the air bearing element shown in FIG. 4a;

FIG. 4d depicts a top view of an air bearing element with a plurality of micronozzles in 110-silicon;

FIG. 4e depicts a side view of the air bearing element shown in FIG. 4d;

FIG. 4f depicts a bottom view of the air bearing element shown in FIG. 4d;

DETAILED DESCRIPTION OF THE PREFERRED EMBODIMENT

Figure 1A:
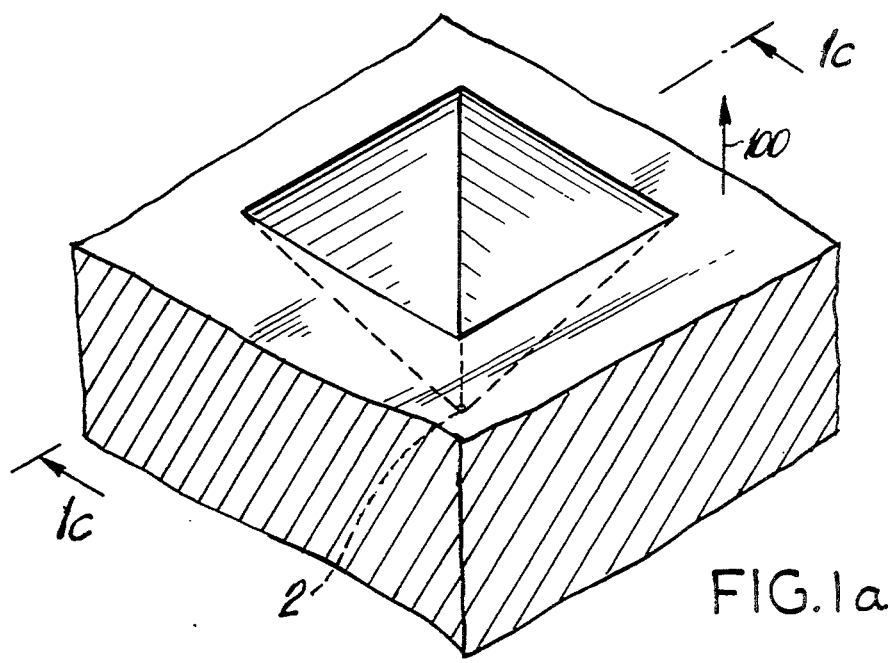
FIG. 1a depicts a partial perspective view of an anistropically etched micronozzle in 100-silicon.
Figure 1B:
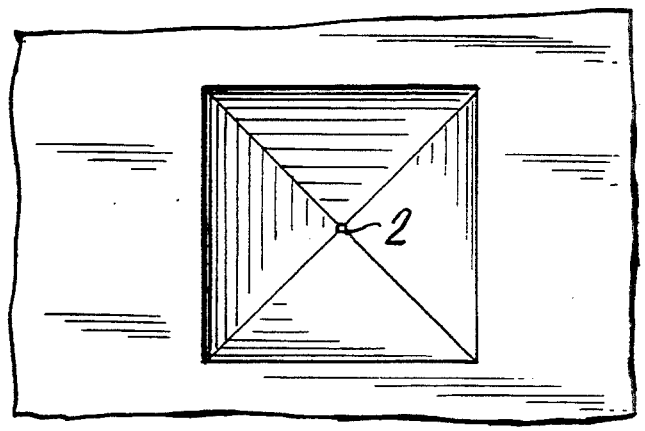
Figure 1C:
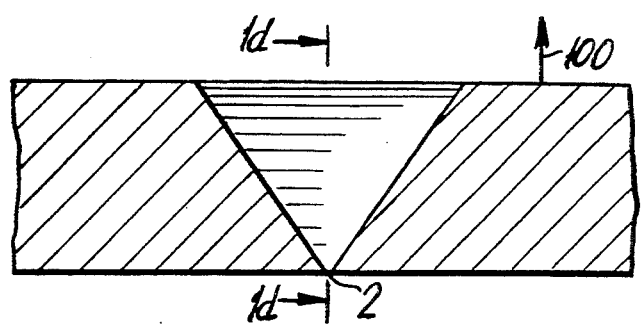
Figure 1D:
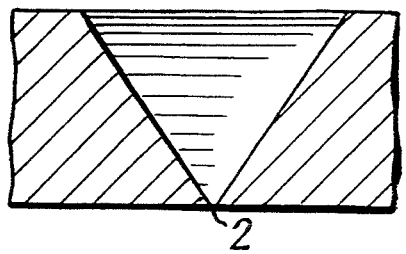
FIG. 1d depicts a cross-sectional view along line 1d—1d in FIG. 1c.
Figure 2A:
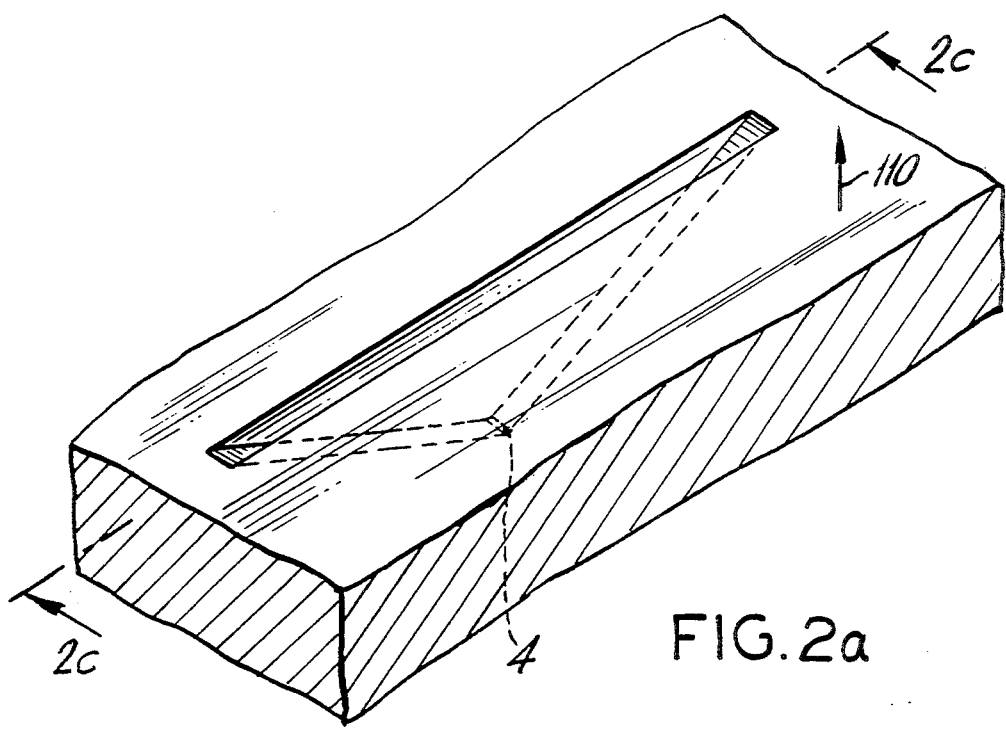
FIG. 2a depicts a partial perspective view of an anistropically etched micronozzle in 110 silicon.
Figure 2B:
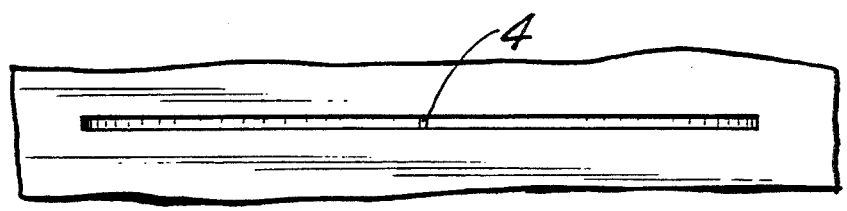
Figure 2C:
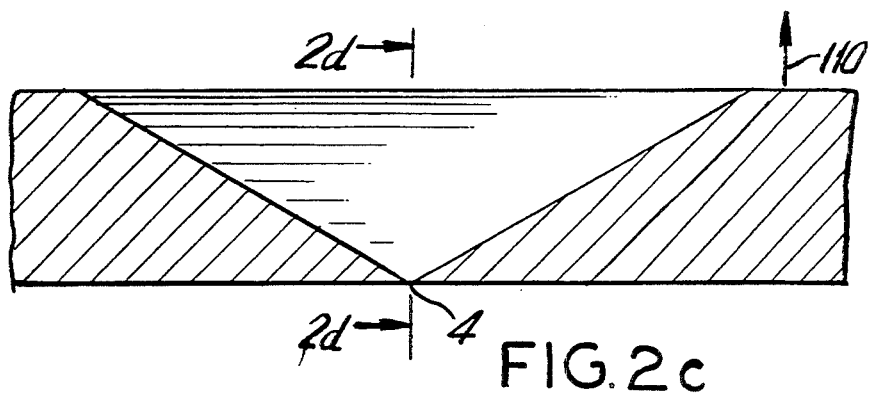
Figure 2D:
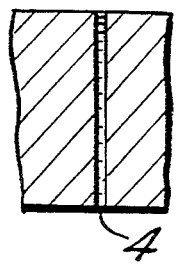
FIG. 2d depicts a cross-sectional view along line 2d—2d in FIG. 2c.

Referring now to the drawings, wherein like numerals designate like elements, FIGS. 1a–1d depict a micromechanically fabricated micronozzle from 100-silicon. Pyramid shaped passages through the silicon wafer are produced by means of suitable masking and photolithographic technology, so that the narrowest point of the passage forms the orifice 4. This orifice faces the air bearing-or support-gap.

FIGS. 2a–2d depict a micro nozzle manufactured micromechanically from 110-silicon. Wedge-shaped passages through the silicon wafer are produced by means of suitable masking and photolithographic technology so that the narrowest point of the passage forms the orifice. This orifice faces the air bearing gap.

In FIGS. 3a and 3b, the numeral 6 designates an etched stop layer on 100-silicon and 8 designates an etched stop layer on 110-silicon respectively. Such layers, for instance bordered surface layers, can stop the anisotropic etching. Precisely defined nozzles can be placed subsequently into the remaining membrane by photolithographic masking and subsequent etching.

In FIGS. 4a–4c and 4d–4f, the numeral 10 designates a micro-nozzle in 100-silicon and 12 designates a micro-nozzle in 110-silicon. By disposing a plurality of micromechanically fabricated nozzles upon a silicon chip, supporting elements can be formed which have a large support or carrying power capability and stiffness. The elements must be applied on a support structure through which each individual nozzle is supplied with air.

Figure 5:
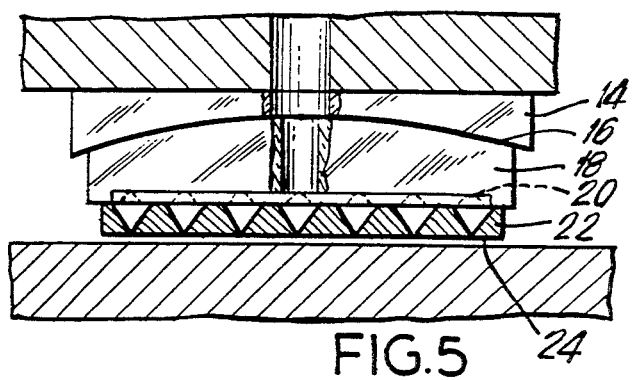
FIG. 5 depicts a self-adjusting support design with air bearing elements.

In FIG. 5, the numeral 22 designates an air bearing element which is supported or carried by a self-adjusting support construction. The air bearing element 22, provided with a plurality of micronozzles, is connected to the support member 18 of glass, for instance, by anodic bonding. Feed channels 20 for air are formed in the support member by means of photolithography and an etching process so that every nozzle is fed with air.

The support member 18 is connected with the matching piece 14 by a spherical contact surface 16, whereby the support member 18, together with the bearing element 22, can adjust themselves or be adjusted in such a way that a parallel air gap 24 results. After the adjustment has been made, it can be made permanent or fixed by hardening of an adhesive located in the spherical contact surface 16. The air supply into the distribution channel 20 occurs through central bores in the support member 18 and its matching piece 14 which permit air to pass also after the adjustment and fixation by adhesive.

Figure 6:
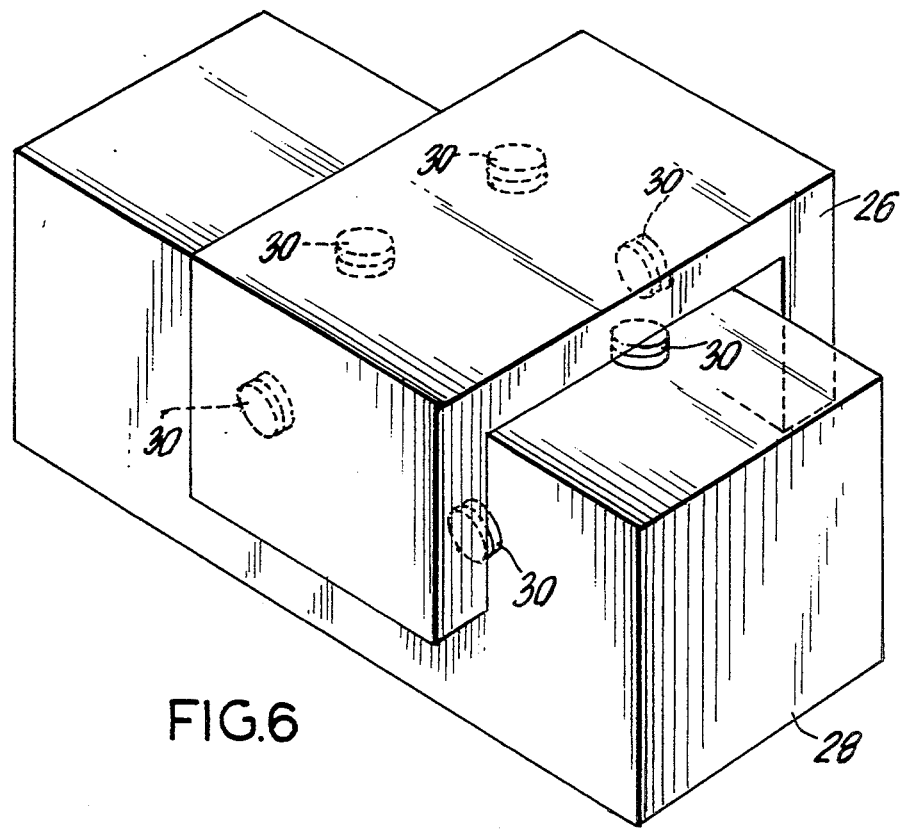
FIG. 6 depicts linear guidance with six self-adjusting bearing or support elements.

In FIG. 6, the numeral 28 designates the stationary cubical beam of metal, glass, granite or ceramic glass (Zerodur). A trolley 26 is seated thereon, which is supported upon the beam by six self-adjusting air bearings or support elements 30. The self-adjusting property of the bearing elements permits the fabrication of guides with the highest accuracy with slight adjusting effort.

Figure 7:
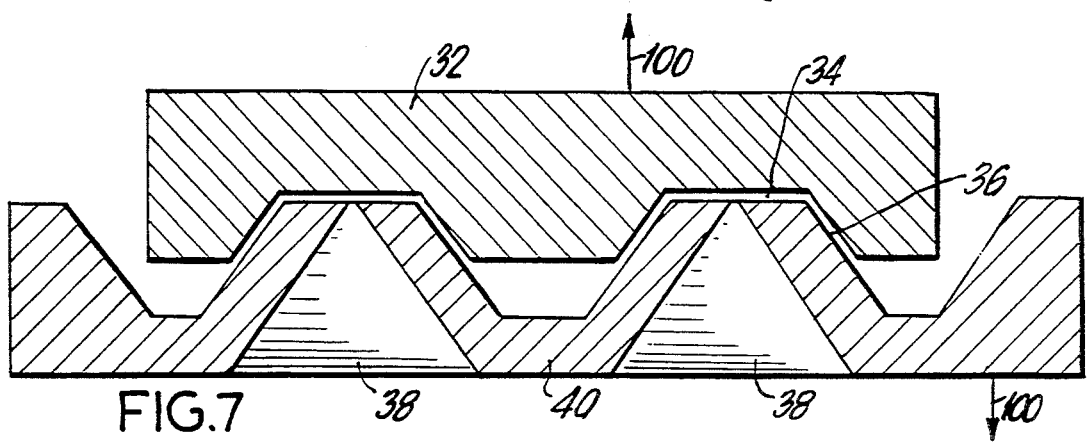
FIG. 7 depicts linear guidance from anisotropically etched silicon.

The numeral 40 designates in FIG. 7 the bed of a micromechanical linear guide. 32 designates the mobile trolley of the linear guide. The trolley 32 and the bed 40 are manufactured from 100-silicon by anisotropic etching. The trolley 32 is guided by the bed, which has an appropriate shape, in such a way that it can perform only a linear motion. The micronozzles distributed across the area are disposed in two rows, where the nozzles are arranged as closely to one another as possible. Air enters into the horizontal bearing gap 34 through anisotropically etched nozzles 38 such that overpressure exists in said bearing gap. The air flows out through the inclined parallel bearing gap 38, which has a height of approximately 100 nm. The manufacturing process involving anisotropic etching results in the inclined bearing gap 36 being very precise and planar to the extent that reproducible linear motions with a precision of 1 nm may be achieved. The horizontal bearing gap 34, which cannot be as accurately manufactured by this process, has therefore a greater height. Such a linear guide could be driven by integrated micromechanical linear actuators.

Compared to what was previously known, the invention represents a technical advance of several magnitudes since it enables the manufacture of air bearings which are able to fulfill two essential functions, especially in microtechnology such as this, for the support and movement of microstructural elements. More recent experience with micronozzles distributed over an area has demonstrated that only air supports or air bearings, without dead volume and without flow turbulence, operate without mechanical noise. Miniature air bearings or supports are particularly suited to achieve this bearing or support property.

The invention enables production of air bearings with such accuracy that micromechanical components can be supported without any wear occurring. Moreover, precise guidance in the nanometer range can be achieved. Scanner tunnel microscopy permits measuring of surfaces at an atomic scale. This requires precise and reproducible motion of a scanning electrode relative to the object to be measured. These most precise movements were hitherto produced exclusively by piezoelectric actuators. These ceramic elements, which contract or expand under the effect of an electric field, are limited in their output performance. Additionally, the movement strokes are limited and linearity can be achieved only in case of small excursions. Thus, the surface scannable by commercial microscopes is limited to 20 nm×20 nm, with the most precise air bearings or air supports, which are meant to be manufactured micromechanically, it now appears to be possible to build the most minute linear guides and to drive these by micro actuators. The guidances would enable scanning a considerably larger area by scanning tunnel microscopes.

Other measuring processes of microtopography (for instance interference microscope) achieve their accuracy in the nanometer range only by appropriately precise guidance. Such an extremely precise guidance could also be used for microoptical systems, which could linearly displace the optical elements as, for instance, triple reflectors with high precision.

While the preferred embodiment of the invention has been disclosed in detail, modifications and adaptations may be made thereto, without departing from the spirit and scope of the invention, as delineated in the following claims.

What is claimed is:

1. A miniature air bearing, comprising:
   a bearing body having two support surfaces, wherein one of the two surfaces is formed by monocrystalline silicon; and
   a plurality of micronozzles provided on said one of said two surfaces and formed by anisotropic etching.

2. The miniature air bearing of claim 1, wherein precise dimensions of the nozzle are bounded by a structured etching stop.

3. The miniature air bearing of claim 1, wherein said monocrystalline silicone has an orientation of 100, wherein the plurality of micronozzles comprises a plurality of flattened tip pyramid-shaped passages bounded by 111-crystal faces, and wherein tips of the pyramid-shaped passages point to a support gap.

4. The miniature air bearing of claim 1, wherein said monocrystalline silicon has an orientation of 110, wherein the plurality of micronozzles comprises a plurality of substantially wedge-shaped passageways bounded by 111-crystal faces and wherein tips of the wedge shaped passages point towards a support gap.

5. The miniature air bearing of claim 1, wherein another of said two surfaces also comprises monocrystalline silicon; and said two support surfaces are prismatically shaped by anisotropic etching to permit only a translational motion.

6. The miniature air bearing of claim 5, further comprising a micromechanical actuator, which is integrated into a micromechanical guide and which actuates linear motion.

7. The miniature air bearing of claim 1, further comprising:
   a glass support member;
   a silicon chip defining said one of said support surfaces, wherein the silicon chip with the micronozzles is applied to the glass support member; and
   an aperture for feeding the air and channels for distributing air to passages in the silicon chip leading to the micronozzles.

8. The miniature air bearing of claim 7,
   wherein the glass support member has distribution channels etched therein; and
   wherein a connection between the glass support member and the silicon chip is formed by anodic bonding.

9. The miniature air bearing of claim 8, further comprising:
   a matching piece; and
   wherein rear side of the support member is spherically curved and is fitted into the matching piece in such a way that the air can pass through the support member and the matching piece, and that a sperical bearing is formed, whereby the miniature air bearing becomes self-adjusting.

10. The miniature air bearing of claim 9, wherein displacement between the support member and the matching piece is eliminated if the miniature air bearing is self-adjusted and the orientation is fixed.

11. A miniature air bearing for supporting and guiding moving parts on one surface wherein this surface is formed by monocrystalline silicon; and
   a plurality of micronozzles for feeding air with precisely defined throttling properties provided on said surface and formed by anisotropic etching.

* * * * *